Patented Mar. 1, 1927.

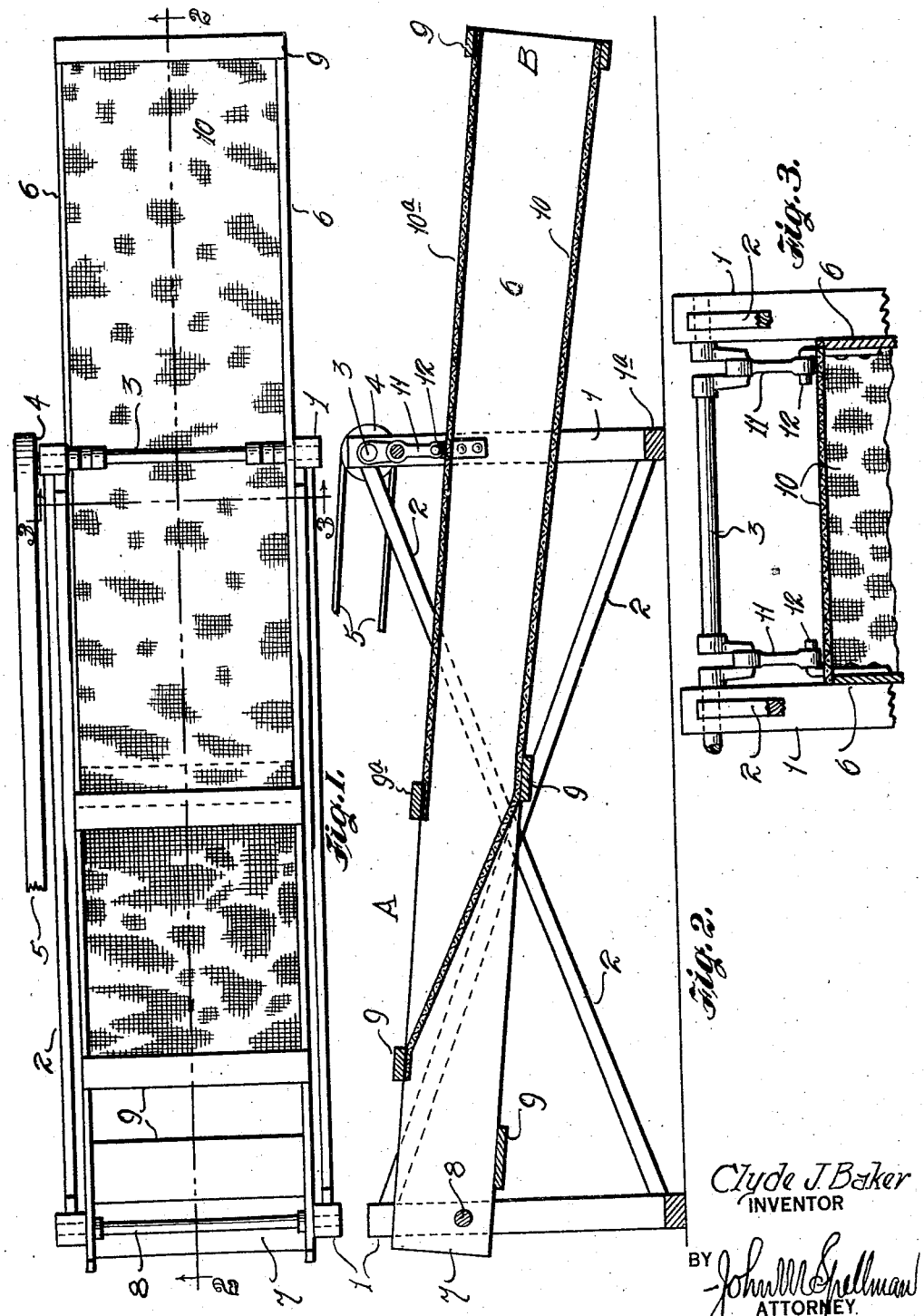

1,619,178

UNITED STATES PATENT OFFICE.

CLYDE J. BAKER, OF WELLINGTON, TEXAS.

COTTON CLEANER.

Application filed March 29, 1926. Serial No. 98,238.

This invention relates to improvements in cotton cleaners and has for one of its objects the provision of a cotton cleaner of simple construction and inexpensive manufacture.

Another object of the invention is to provide a cotton cleaner of few parts, yet durable and practical and which can be operated on a minimum of power.

The new and improved cotton cleaner will be better and more clearly understood by reference to the following description, in connection with the accompanying drawings forming part hereof and in which—

Figure 1 is a top plan view of a cotton cleaner embodying the invention.

Figure 2 is a longitudinal sectional view along the line 2—2 of Figure 1, and

Figure 3 is a cross-sectional view along the line 3—3 of Figure 1.

Proceeding in accordance with the drawings wherein numerals are employed to designate the various parts, 1 denotes the legs of a frame with braces 2—2 and connected at their lower ends by cross-pieces $1^a$. To one end of the frame is affixed a crank shaft 3, clearly illustrated in Figure 3. The crank shaft is supported upon and between the two outer legs of the frame and is furnished with a pulley 4 for a belt 5 for connection with any suitable source of power.

The cotton picker is designed and constructed to shake and vibrate the cotton in relieving it of its dirt, trash and extraneous matter and for this purpose there is connected to the crank shaft 3, a box of elongated formation, having sides 6 extending from one end of the frame to a point past the crank shaft and outer legs. The inner end 7 of these side portions 6 are loosely traversed by a rod 8, the ends 7 of the sides being near the top of the rear legs, as is clearly shown in Figure 2, and the outer end of the box normally occupies a sloping position. The sides are connected together by cross-pieces 9—9 and over the top and bottom of the box is stretched a screen cloth 10 of relatively small mesh. The top wire $10^a$ is connected to the outermost cross-piece 9 at the delivery end of the box and is directed rearward and connected to the central cross-piece $9^a$. The bottom screen is connected to the sides in the same manner except that from the lower central cross-piece 9 to which it is secured, it diverges obliquely and rearwardly in an upward slanting position and is connected to the upper and rearmost cross-piece 9. The space between the ends of the wire thus form a mouth or receiving end for cotton fed therein, the forward end of the box being also open and serving as a delivery point.

The box is swung slightly past the center thereof by links 11, the lower end of the link being slipped over the projecting end of a member 12 rigidly secured to the sides of the box in the manner illustrated in the drawings.

In operation, the cotton is fed into the receiving end of the box at A and due to the slanting position of the screen is directed downward in between the screens $10^a$ and 10. The power from a source not shown rotating the pulley will as is obvious cause the box to move up and down and the cotton will be agitated and subjected to impact between the screens and thoroughly cleaned. As the cotton is thus shook, agitated and flung up and down, it gradually reaches the mouth B where it is delivered. The speed of vibration as well as the length and size, likewise the slant and position of the box may also be varied according to requirements. Such modifications along with others which may be necessary it is understood will come within the meaning of the appended claims.

What is claimed is:

1. A cotton cleaner comprising a frame, supporting means therefor; an elongated screened box having one end loosely connected to a cross rod in the frame and having connection near its center to a crank shaft in the frame; a pulley secured to the crank shaft and means for driving the pulley; said box having both ends open and screens at the top and bottom, one end adapted to receive cotton from the upper side of the box and the other end adapted to deliver the cotton when cleaned; said crank shaft when rotated by the pulley so arranged that the cotton will be given an agitating up and down movement between the screens of the box in removing the dirt therefrom.

2. A cotton cleaner comprising a frame having an elongated box suspended to oscillate therein to clean the cotton by an up and down movement of the box; said box having its top and bottom screened; means for suspending one end of the box in the frame, said box occupying an angular position in the frame and means for connecting the box near its opposite end to a crank shaft in such manner as to oscillate the box when the crank shaft is rotated in the cleaning of the cotton.

3. A cotton cleaner as set out in claim 1, and wherein said frame includes legs, said crank shaft rotatably connected to two of said legs, links pivotally connecting said shaft to opposite sides of the portions of the cleaner carrying the screens and to the crank shaft; said screen extending beyond the legs at one end.

In testimony whereof I affix my signature,

CLYDE J. BAKER.